J. R. BAUDE.
ANTISKID DEVICE.
APPLICATION FILED MAR. 1, 1920.
1,375,201. Patented Apr. 19, 1921.
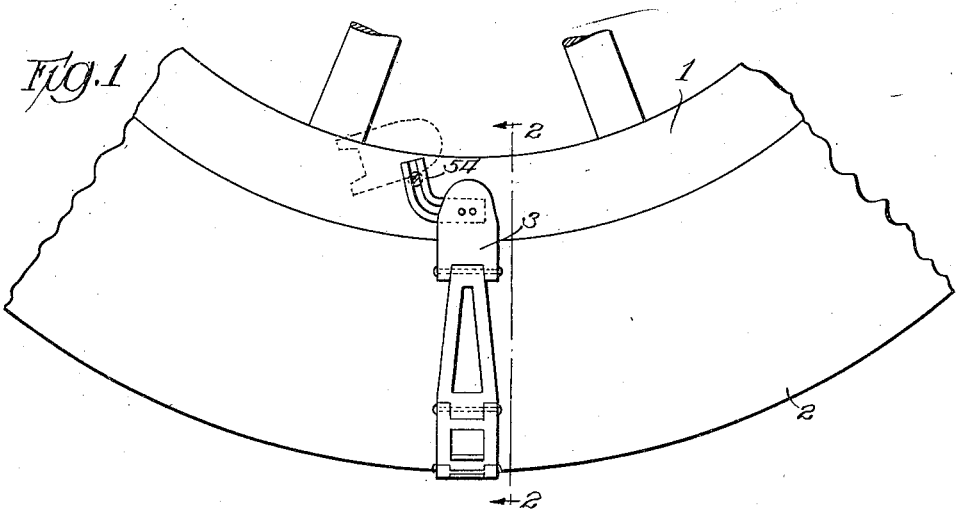
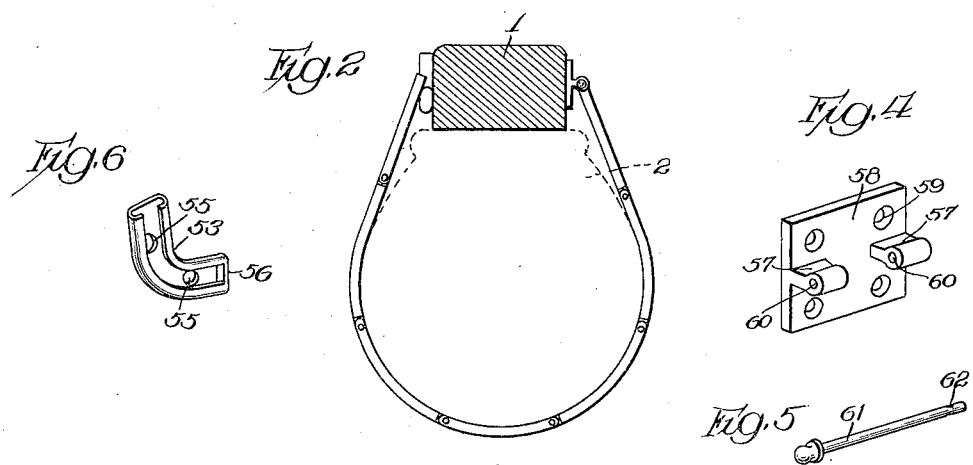
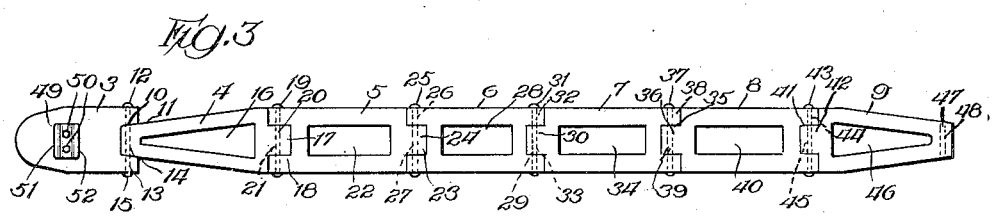
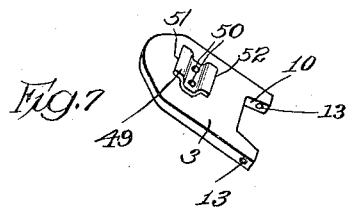
INVENTOR
J. R. Baude
BY Munn & Co
ATTORNEYS

UNITED STATES PATENT OFFICE.

JOSEPH R. BAUDE, OF CHICAGO, ILLINOIS.

ANTISKID DEVICE.

1,375,201.

Specification of Letters Patent.

Patented Apr. 19, 1921.

Application filed March 1, 1920. Serial No. 362,496.

*To all whom it may concern:*

Be it known that I, JOSEPH R. BAUDE, a citizen of the United States, and a resident of Chicago, in the county of Cook and State of Illinois, have invented a new and useful Improvement in Antiskid Devices, of which the following is a full, clear, and exact description.

My invention relates to improvements in anti-skid devices, and it consists in the combinations, constructions, and arrangements herein described and claimed.

An object of my invention is to provide a novel form of anti-skid device that can be quickly attached to the rim of a wheel, whereby skidding forwardly, backwardly and laterally will be prevented.

A further object of my invention is to provide a device of the type described that can be attached or detached quickly without the necessity of using any tools.

A further object of my invention is to provide a device of the type described that is made up of separable members to permit the replacement of a broken member without the interruption of service.

A further object of my invention is to provide a device that is light in weight and will take up little space when not in service, thereby permitting the same to be readily transported from place to place, as in the tool box of an automobile.

A further object of my invention is to provide a device of the type described that is simple in construction and operation and which can be manufactured cheaply.

Other objects and advantages will appear in the following specification, and the novel features of the invention will be particularly pointed out in the appended claims.

My invention is illustrated in the accompanying drawings, forming part of this application, in which—

Figure 1 is a side elevation of a portion of an automobile wheel showing the device applied, the dotted lines indicating the initial position of a portion of the device when the same is being applied, Fig. 2 is a section along the line 2—2 of Fig. 1, Fig. 3 is a detailed view of a portion of the device, Fig. 4 is a perspecive view of a portion of the device, Fig. 5 is a perspective view of another portion of the device, Fig. 6 is a perspective view of still another portion of the device, Fig. 7 is a perspective view of still another portion of the device.

It will be understood that the anti-skid chains in common use are heavy and unwieldy and difficult to adjust under service conditions. Furthermore, the shape of the links in the anti-skid chains of ordinary construction is such that skidding of the car laterally is not prevented when the brakes are applied and the car is being driven upon a smooth substance, as an asphalt pavement. The rear of the car will slide around, often injuring pedestrians or causing damage to property.

In carrying out my invention I make use of the felly 1 of a wheel which has a tire 2 mounted upon its rim. I provide a number of separable links 3, 4, 5, 6, 7, 8, and 9. (See Fig. 3.) These links are preferably formed of light metal stamping, but it will be understood that the same can be manufactured in any approved manner. It will also be understood that the links will vary in size with the size and type of the automobile to which the device is applied.

The link 3 comprises a flat metal stamping having a recess 10 formed in one end. A tapered end 11 of the link 4 is received in the recess 10 and is maintained in position by a pin 12 which is inserted through registering openings 13 and 14 in the link 3 and the tapered end 11 respectively. The pin 12 may be secured in position in any suitable manner, as by having its end 15 upset. The walls surrounding the central opening 16 in the link 4 are at right angles to the plane of the link, thereby affording a means for gripping a surface. A tongue 17 formed integral with the link 4 fits within a slot 18 in one end of the link 5 and is secured thereto by means of a pin 19 which extends through registering openings 21 and 20 in the link 5 and the tongue 17. The link 5 also has a central opening 22 and has a tongue 23 formed at one end. The tongue 23 extends within a slot 24 provided in one end of the link 6 and is secured thereto by means of a pin 25 which extends through registering openings 26 and 27. The link 6 has a central opening 28 and has a slot 29 at its other end. A tongue 30 of the link 7 is received within the slot 29 and is held in position by a pin 31 which is inserted through registering openings 32 and 33.

The link 7 has a central opening 34 and has a slot 35 formed in its other end. A tongue 36 of the link 8 is received within the slot 35 and is held in place by a pin 37 which is inserted through registering openings 38 and 39. An opening 40 is provided in the link 8 which has a slot 41 formed in its other end. A tongue 42 of the link 9 fits within the slot 41 and is held in place by a pin 43 which is inserted through registering openings 44 and 45. An opening 46 is provided within the link 9. The openings 22, 28, 34, 40, and 46 are all surrounded by walls extended at right angles to the respective links to insure the individual lengths gripping a surface securely.

The link 9 has a tapered end 47 with an opening 48 formed therethrough.

A metal member 49 is secured upon the link 3 by means of screws 50. The member 49 has opposite side edges 51 and 52 bent upwardly and then outwardly. An L-shaped metal member 53 (see Fig. 6) is secured to the felly 1 by means of screws 54 inserted through openings 55. The side edges of the member 53 are bent upwardly and then inwardly to provide a guiding and retaining member adapted to receive the side edges 51 and 52 of the member 50. The member 53 is closed at 56.

From the foregoing description of the various parts of the device, the operation of the device may be readily understood. In applying the device, the link 3 is placed in the position indicated by the dotted lines in Fig. 1. The side edges 51 and 52 of the member 50 are received within the guiding and retaining member 53 and the link 3 is moved into the position indicated by the full lines in Fig. 1 of the drawings. To fasten the device in place about the tire 2, the tapered end 47 of the link 9 is inserted between the upright extensions 57 upon a metal member 58 which is secured to the opposite side of the felly 1 by means of screws which are inserted through the openings 59. Openings 60 are formed through the extensions 57 to register with the opening 48 provided in the tapered end of the link 9. A pin 61 is inserted through the registering openings 60 and 48 to hold the link 9 in position. An opening 62 is provided in the end of the pin 61 and a cotter pin (not shown) may be used, if required, to maintain the pin 61 in position.

It will be understood that a plurality of my improved anti-skid devices will be placed at spaced distances around the rim of an automobile wheel. The device can be instantly attached under all conditions and as quickly detached when there is no necessity for using the same. When not in service, the device can be readily carried since it is light in weight and should any of the component links be broken, they may be replaced by other links without loss of time.

It is obvious that many modifications of the device illustrated in the accompanying drawings may be made without departing from the spirit and scope of the invention as set forth in the foregoing disclosure and outlined particularly in the appended claims. I therefore consider such modifications as my own.

I claim:

1. An anti-skid device for automobiles comprising a plurality of separable links, each link being secured at an end to the adjacent end of the next successive link, and means for detachably securing the remote ends of the end links to opposite sides of a felly of an automobile wheel, said means comprising a guiding and retaining member fastened to a side of the felly and closed at one end, a guide member secured to an end link and adapted to be received by said guiding and retaining member, a plate secured to the opposite side of said felly, said plate having a pair of upright extensions spaced apart to receive the tapered end of an end link, and a pin adapted to be inserted through registering openings through said upright extensions and the end of said end link.

2. An anti-skid device for automobiles comprising a plurality of separable links having their adjacent ends linked together, the end links thereof tapering toward their remote ends, and means for detachably securing the remote ends of the end links to the opposite sides of the felly of an automobile wheel, said last named means comprising a guiding and retaining member fastened to a side of the felly and closed at one end, a guide member adapted to be received by said guiding and retaining member and being formed with a recess adapted to receive the tapered end of an end link, means for securing the tapered end of said end link in said recess, a plate secured to the opposite side of said felly, said plate having a pair of upright extensions spaced apart to receive the tapered end of the second end link, and a pin adapted to be inserted through registering openings through said upright extensions and the end of said end link.

JOSEPH R. BAUDE.